Figure 1:
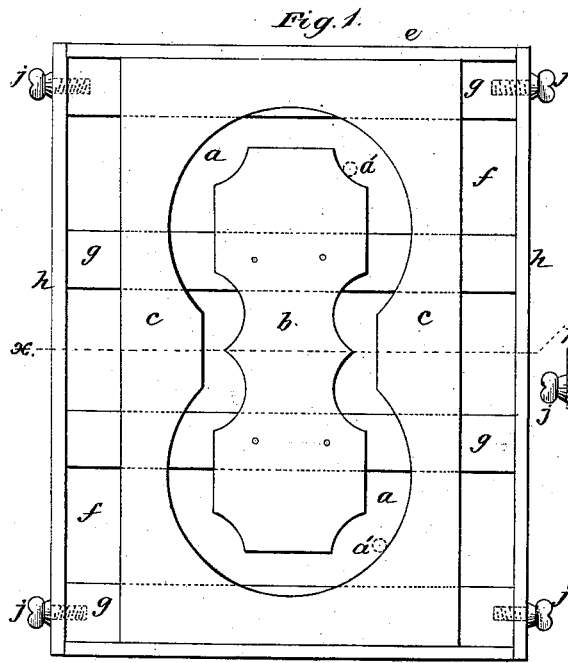

(No Model.)

L. WENCHEL.
TEMPLET FOR MOLDING AND PANELING MACHINES.

No. 260,264. Patented June 27, 1882.

Witnesses:
Jas. E. Hutchinson.
Edmund Brodhag

Inventor.
Laurence Wenchel
by Johnson & Johnson
Attys

UNITED STATES PATENT OFFICE.

LAURENCE WENCHEL, OF BALTIMORE, MARYLAND.

TEMPLET FOR MOLDING AND PANELING MACHINES.

SPECIFICATION forming part of Letters Patent No. 260,264, dated June 27, 1882.

Application filed June 13, 1881. (No model.)

*To all whom it may concern:*

Be it known that I, LAURENCE WENCHEL, a citizen of the United States, residing at Baltimore city, in the State of Maryland, have invented new and useful Improvements in Templets or Patterns for Molding and Carving Machines, of which the following is a specification.

The invention herein relates to the art of carving and ornamenting upon the surface of wood by means of a pattern and a guide-pin for controlling the path of the revolving cutter over which the surface to be ornamented is manipulated.

A distinctive feature of my invention is the employment of two or more separated patterns having a fixed relation to each other in the same frame, each forming a distinct working-pattern for producing at one continuous operation of the cutter and continuous manipulation of the patterns two separate and distinct ornamentations or designs without removing the work or changing the patterns, the same being a duplex pattern, with an intervening path for the guide-pin, whereby the work is fed forward to the cutter, first on the line of one pattern, and then, changing the movement of the work, feeds in the reverse direction on the line of the other pattern, which gives a forward feed and cut for each pattern and produces smooth work on both cuts. This method embraces the plan in which the pattern is attached to the back of the article to be ornamented, with an under-operating cutter and an insertible guide-pin carried above the pattern. The holder for the duplex pattern is adapted also to hold the wood to be ornamented, and constitutes an entirety, provision being made whereby it is rendered adjustable to obtain a level bearing upon the table independent of the surface of the work, which may not be true. This adjustable holder is equally important in using single patterns, and it is especially advantageous in operating upon work in which the panel proper has a veneered surface, which would cause the work to rock and spoil the molding.

In the production of what is known as "variety panel-moldings," patterns have been adapted to be fitted accurately one within and joining the other, so that the cutter, having traversed its path governed by the interior edge of one pattern and produced a corresponding paneling cut, is removed out of the way to allow for putting in another pattern for operation in the same way. In this way successive operations to produce variety-moldings have been effected by dropping within the main pattern successive inside patterns, by which the cutter can only operate under the direction of one forming-edge within its path, so that the interchangeable patterns are in effect single patterns adapted for producing single moldings within the cutter-path, whereas in my method a duplex fixed pattern is adapted to produce a variety-molding upon the same panel within the path of the cutter at one continuous operation of the cutter without change of pattern, without disturbing the position of the cutter, and in a continuous manipulation of the patterns.

Figure 2:
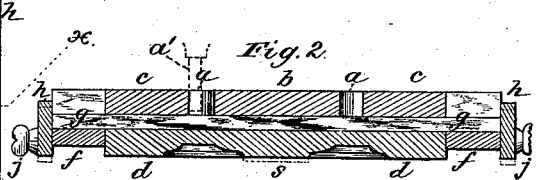
Figure 3:
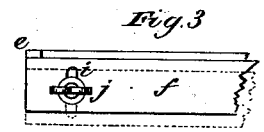
Figure 4:
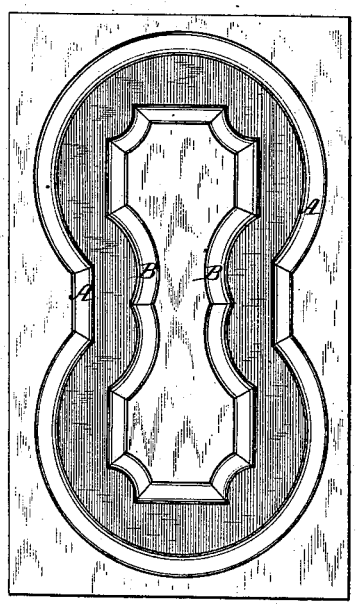
Figure 5:
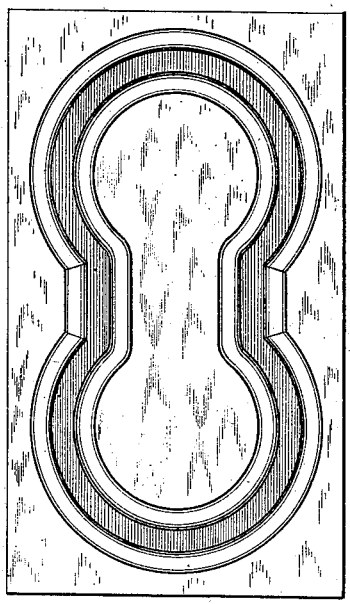

Referring to the accompanying drawings, Figure 1 represents a top view of my improved pattern and its holder for molding-machines; Fig. 2, a cross-section of the same; Fig. 3, a detail of one of the leveling-bearings for the pattern and work holder; Fig. 4, a panel of variety-molding produced by my duplex pattern, and Fig. 5 a molding produced only from the ordinary pattern.

The pattern is formed of two parts, one within the other, with a space, $a$, between their guiding or working edges, the guiding-lines of each part describing a different route. This space is made wider than the diameter of the guide-pin $a'$, (shown by dotted lines in Figs. 1 and 2,) for a purpose to be stated, and within it the guide-pin, from an overhanging position in the machine, operates in the manipulations of the patterns. The parts of the patterns are of separate and distinct designs, the inner one, $b$, having a fixed relation to the outer one, $c$, the intervening space, $a$, giving the advantage of two separate and distinct cuts in the same path in one continuous operation of the cutter and in a continuous manipulation of the patterns. They are secured in the same plane in the top of a frame or holder, which also serves as a holder for the work $d$ to be ornamented, and which is secured in a seat on the under side of the frame in proper relation to the patterns, so as to project beyond the plane of the holder.

I prefer to use an open or skeleton frame to give the advantage in observing the grain and character of the wood, so as to regulate the speed of the feed in working over knots and cross-grain; but it may be solid or closed. The frame shown consists of end strips, e e, united by longitudinal side strips, f f, and cross-strips g, and to these the patterns are secured, as shown. The cross-strips support and brace the pattern and prevent the vibration of the sides of the pattern c, which, in a long narrow pattern, would bend by the force of the cutter, the guide-pin being held against the pattern-edge and the cutter drawing in the work. The staying of the frame produces smooth work, whether the pattern is used in single or duplex form. By having such a combined pattern and work holding frame I am enabled to provide such frame with means by which it is rendered adjustable to obtain a level bearing upon the table. This is important, because the work may not always have a true surface, from warping and other cause. Such adjustment is especially important in operating upon work having a veneered panel-surface, as shown by dotted lines s in Fig. 2, which would render the work liable to rock in being manipulated and produce irregularity in the moldings. For effecting such adjustment the frame is provided with levels or gages h h on each side, which are set to give a true and firm bearing upon the table and prevent the spoiling of the work from the causes stated. The levels or bearing-strips are provided with vertical slots i, through which thumb-screws j pass into the frame to set the bearings or levels, as may be required to level the frame. The levels may be longer than the frame, to give more bearing, especially in working short panels, there being a separate frame for different-sized panels.

I have stated that the width of the space a between the working-edges of the patterns is greater than the diameter of the guide-pin a', (shown in dotted lines in Fig. 1 in the position it has in working with the inside and outside patterns,) this because the cutter must first cut the outer molding; and in shifting the position of the pattern to bring the guide-pin from contact with the outer pattern-edge against the inner pattern-edge the first-cut molding will be carried free of the cutter in its continuous operation in cutting the inner molding of different design. But for this capacity in the manipulation of the patterns in shifting the contact of the bearing guide-pin from one pattern-edge to another, it would not be possible to produce the inner and the outer moldings of different designs in a continuous operation of the cutter. In using a single pattern the path of the cutter determines the width of the cut and forms the inner and the outer moldings alike, as in Fig. 5.

In Fig. 4, which is the panel produced by my improved patterns, A represents the molding corresponding to the outer pattern, c, and B the molding corresponding to the inner pattern, b.

In using the pattern-frame the work is secured in the seat formed for it in the frame, as described. The frame is then placed upon the table of the cutter. The guide-pin is then brought down into the space a between the patterns, and the cutter is raised through an opening in the table for operation upon the work. The pattern-frame is then moved by the operator so as to bring that side of the outer pattern, c, edge which is nearest the operator against the guide-pin and fed forward upon the revolving cutter, the action of which will draw the pattern against the guide-pin. The outer molding being thus completed, the pattern-frame is then shifted so as to bring the inner pattern, b, edge in contact with the guide-pin and fed in a direction opposite to that of the first cutting until the inner molding is completed. This gives a forward cut for each molding, producing at one continuous operation an outer molding of one form and an inner molding of another or different form or design without changing the working position of the cutter, the relation of the work thereto, and by means of patterns having the working-edges separated and forming the inner and the outer walls for a bearing-pin, which controls the path of the cutter.

The panel-surface recess may be of any desired width, and may have beads formed thereon, if desired.

Each molding may have the same depth of cut; or one may be deeper than the other by changing the set of the cutter.

I prefer to construct the pattern-frame with the cross-strips set flush with the side strips, to give greater firmness to the frame.

It will be understood that another pattern may be formed within the pattern b for operation with the guide-pin and the cutter in the same manner as with the patterns described, in which case, however, the pattern would have to be changed in its relation to the cutter and the guide-pin in using said interior pattern.

I claim—

1. The edge-patterns b and c, separated by an opening, a, having a width greater than the diameter of an insertible guide-pin, in combination with the frame e f, having the open-edge pattern b on one side and a holding-seat on its other side for the work, and means for supporting and bracing the edge-pattern c within the open-edge pattern, whereby the separate edge-patterns are secured in proper relation to each other for separate manipulation against the side of the pin, for the purpose described.

2. The templet herein described, consisting of the open-edge pattern b and the inner-edge pattern c, separated by an opening, a, having a width greater than the diameter of the guide-pin, a frame, e f, supporting the open-edge pattern on one side, having a recessed back for holding the work, and the cross supporting-braces $g$ $g$ for the inner-edge pattern $c$, substantially as described, for the purpose specified.

3. In combination, the pattern or patterns, a holding-frame therefor and for the work, and adjusting leveling strips or bars attached to said frame, so as to ride upon the table in manipulating said holding-frame, substantially as described, for the purpose specified.

In testimony whereof I have hereunto set my hand in the presence of two subscribing witnesses.

LAURENCE WENCHEL.

Witnesses:
A. E. H. JOHNSON,
J. W. HAMILTON JOHNSON.